United States Patent [19]
Malladi et al.

[11] Patent Number: 5,912,676
[45] Date of Patent: Jun. 15, 1999

[54] MPEG DECODER FRAME MEMORY INTERFACE WHICH IS RECONFIGURABLE FOR DIFFERENT FRAME STORE ARCHITECTURES

[75] Inventors: Srinivasa R. Malladi, Santa Clara; Surya Varansi, Fremont; Vanya Amla, Santa Clara, all of Calif.

[73] Assignee: LSI Logic Corporation, Milpitas, Calif.

[21] Appl. No.: 08/664,135

[22] Filed: Jun. 14, 1996

[51] Int. Cl.$^6$ ................................................ G06F 13/16
[52] U.S. Cl. ............................ 345/521; 345/516; 348/718; 395/853; 711/1
[58] Field of Search .................... 345/418, 302, 345/419, 433, 441–443, 501, 503, 520, 521, 526, 507–509, 511, 512, 515–518, 186, 188, 191, 202, 203; 348/390, 400, 403, 420, 422, 714–721; 395/821, 823–825, 842, 843, 850, 853–855, 858, 859, 872; 711/1, 5, 100, 104–106, 147–153, 202, 209, 217, 218–220

[56] References Cited

U.S. PATENT DOCUMENTS 5,557,302  9/1996  Levinthal et al. ...................... 345/509
5,598,352  1/1997  Rosenau et al. ........................ 345/302
5,694,585  12/1997  Dwin et al. ............................. 345/521

*Primary Examiner*—U. Chauhan

[57] ABSTRACT

A frame memory interface architecture which is easily adaptable to interface to any of a plurality of frame memory storage architectures. In the preferred embodiment, the present invention comprises an MPEG decoder system and method for decoding frames of a video sequence. The MPEG decoder includes various slave devices which access a single external memory, wherein these slave devices include reconstruction logic or motion compensation logic, a reference frame buffer, display logic, a prefetch buffer, and host bitstream logic, among others. Each of the slave devices is capable of storing or retrieving data to/from the memory according to different frame storage formats, such as a scan line format, a tiled format, and a skewed tile format, among others. The frame memory interface is easily re-configurable to each of these different formats, thus providing improved efficiency according to the present invention. The slave device then generates a request to the memory controller. In response to the request, the memory controller reads the memory transfer values stored by the slave device and sets up an address generation process based on the memory transfer values. The memory controller then generates addresses to the memory according to this address generation process to perform the memory transfer based on the memory transfer values.

27 Claims, 16 Drawing Sheets

| | 0 | 15 | 31 | 47 | 703 | 719 |
|---|---|---|---|---|---|---|
| 0 | MB0 | MB1 | MB2 | ... | ... | MB44 |
| 15 | MB45 | MB46 | MB47 | ... | ... | MB89 |
| 31 | ... | ... | ... | ... | ... | ... |
| 463 | MB1305 | MB1306 | MB1307 | ... | ... | MB1349 |
| 479 | | | | | | |

Macroblocks in a Picture Frame or Graphics Frame

FIG. 13

Tile Format for Frame Store

Raster Scan Format for Frame Store

Map of reference field/frame with odd number of macroblocks in a line

Map of reference field/frame with even number of macroblocks in a line

MPEG DECODER FRAME MEMORY INTERFACE WHICH IS RECONFIGURABLE FOR DIFFERENT FRAME STORE ARCHITECTURES

INCORPORATION BY REFERENCE

The following references are hereby incorporated by reference.

The ISO/IEC MPEG specification referred to as ISO/IEC 13818 is hereby incorporated by reference in its entirety.

FIELD OF THE INVENTION

The present invention relates generally to digital video compression, and more particularly to an MPEG decoder system having a frame memory interface which is easily reconfigurable for different frame storage formats and which provides optimum bandwidth capabilities.

DESCRIPTION OF THE RELATED ART

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of fill motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for an exact, or near exact, match between the target picture macroblock and a block in a neighboring picture referred to as a search frame. For a target P frame the encoder searches in a prior I or P frame. For a target B frame, the encoder searches in a prior or subsequent I or P frame. When a match is found, the encoder transmits a vector movement code or motion vector. The vector movement code or motion vector only includes information on the difference between the search frame and the respective target picture. The blocks in target pictures that have no change relative to the block in the reference picture or I frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS)} to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. As described above, motion estimation is the task of identifying temporal redundancy between frames of the video sequence.

When an MPEG decoder receives an encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to recreate or reconstruct the temporally compressed frames.

When frames are received which are used as references for other frames, such as I or P frames, these frames are decoded and stored in memory. When a temporally compressed or encoded frame is received, such as a P or B frame, motion compensation is performed on the frame using the prior decoded I or P reference frames. The temporally compressed or encoded frame, referred to as the target frame, includes motion vectors which reference blocks in prior decoded I or P frames stored in the memory. The MPEG decoder examines each motion vector, determines the respective reference block in the reference frame, and accesses the reference block pointed to by the motion vector from the memory in order to reconstruct the temporally compressed frame.

A typical MPEG decoder includes motion compensation logic which includes local or on-chip memory. The MPEG decoder also includes an external memory which stores prior decoded reference frames. The external memory is typically a paged memory which stores data in a plurality of pages. As is well known, when data is accessed within a page, the memory accesses occur quickly, i.e., without wait states, because the row address strobe (RAS) and column address strobe (CAS) are common. However, when a page miss or page crossing occurs, i.e., when data is required which is located on a different page than the page currently being accessed, then a new RAS and CAS are required, thus requiring wait states. This increases the memory access latency and thus reduces system performance.

Frame Storage Formats

Various frame storage formats exist for storing frame data in memory. One method for storing a frame of pixel data is on a scan line basis. In other words, the data is stored in memory scan line by scan line. Thus, each memory page will typically store one or more scan lines. Storing pixel data in pages on a scan line basis is optimum for pictures or frames which are to be displayed. However, when this storage format is used to store a reference frame of pixel data used in motion compensation or reconstruction, this format requires a large number of page crossings.

Another approach to storing reference frame data is to store the macroblocks comprising the reference frame in memory pages in a tiled format to reduce the number of page crossings. This method of storage takes advantage of the fact that the pixels have a 2-dimensional spatial relation, not just a linear relation. This storage format thus provides improved performance for storing a reference frame of pixel data.

U.S. patent application Ser. No. 08/772,442, titled "System and Method for Performing Motion Compensation Using a Skewed Tile Storage Format for Improved Efficiency" filed Dec. 20, 1996, discloses a frame storage architecture which stores reference frame data in a skewed tile format to provide a guaranteed maximum number of page crossings. In other words, the skewed tile format limits the maximum number of page crossings, thus providing improved performance.

Therefore, in some cases it is desirable for a frame storage memory interface to be able to accommodate different MPEGs/graphic frame store architectures. As described above, various examples of frame store architectures include a scan line format, a tiled format, and a skewed tile format, among others.

Frame Storage Memory Interface

Various types of memory interface implementations have been used in MPEG decoder systems. As shown in FIG. 1, one memory interface approach comprises an implementation of multiplexed address/data lines. As shown, each of the plurality of devices are coupled through a multiplexer to the memory device. One disadvantage of this method includes routing congestion due to the multiplexers as well as larger gate complexity. Further, each device is required to interact with memory and thus requires memory access hardware for accessing the memory. A second approach for a memory interface design is to use a microcontroller or microprocessor in conjunction with a direct memory access (DMA) controller, wherein the microcontroller or microprocessor sets up the DMA controller to perform transfers. With this scheme, burst operations are difficult to implement, resulting in a loss of memory bandwidth. A third approach comprises developing a custom memory architecture for a given MPEG/graphics frame store architecture. This results in a large amount of inflexibility whereby the custom memory architecture cannot be easily adapted to other MPEG/graphic frame store architectures. Each of the above memory interface types also do not generally result in optimal bandwidth utilization.

Therefore, a new frame memory architecture is desired which provides a flexible efficient MPEG/graphics frame memory interface that accommodates different MPEG/graphics frame store architectures. An improved frame memory interface architecture is also desired which maximizes memory bandwidth utilization and which also reduces overhead associated with page switching or page crossing, such as during motion compensation or frame reconstruction.

SUMMARY OF THE INVENTION

The present invention comprises a frame memory interface architecture which is easily adaptable to interface to any of a plurality of frame memory storage architectures. In the preferred embodiment, the present invention comprises an MPEG decoder system and method for decoding frames of a video sequence. The preferred embodiment of the invention comprises a computer system including a video decoder or MPEG decoder which receives a compressed video file or video bitstream and generates a noncompressed or decoded video stream. The MPEG decoder includes various slave devices which access a single external memory, wherein these slave devices include reconstruction logic or motion compensation logic, a reference frame buffer, display logic, a prefetch buffer, and host bitstream logic, among others.

Each of the slave devices is capable of storing or retrieving data to/from the memory according to different frame storage formats. Examples of these formats include a scan line format, a tiled macroblock format, and a skewed tile macroblock format, among others. The frame memory interface is easily re-configurable to each of these different formats, thus providing improved efficiency according to the present invention.

When a slave device desires to perform a memory transfer to/from the external memory, the slave device first stores a plurality of memory transfer values to identify the transfer. These plurality of values include a byte per row value indicating a number of bytes per row to be read/written, a skip bytes value indicating a number of bytes to be skipped in a row during the read/write transfer, and a number of rows value indicating the number of rows to be read/written in the transfer. The memory transfer values may also include a start address value within the page of the memory where the memory transfer is to begin, as well as a local start address value indicating a start address for buffers in the slave device where data is to be read/written.

After the slave device programs these values to set up the transfer, the slave device generates a request to the memory controller. In response to the request, the memory controller reads the memory transfer values stored by the slave device. The memory controller then sets up an address generation process based on the memory transfer values. The memory controller then generates addresses to the memory according to this address generation process to perform the memory transfer based on the memory transfer values.

Where the memory transfer operation comprises transferring an object having a non-rectangular shape, the slave device further programs a left offset value and a right offset value, wherein the left offset value indicates a number of bytes to the left of a start address point, and the right offset value indicates a number of bytes to the right of the start address point. The slave device also programs a left increment/decrement value and a right increment/decrement value. The left increment/decrement value indicates an increasing/decreasing progression for a left side of the object, and the right increment/decrement value indicates an increasing/decreasing progression for a right side of the object. In performing the transfer of an object having a non-rectangular shape, the memory controller generates addresses to the memory to perform the memory transfer using the left and right offset values and the left increment/decrement and right increment/decrement values.

BRIEF DESCRIPTION OF THE DRAWINGS

A better understanding of the present invention can be obtained when the following detailed description of the preferred embodiment is considered in conjunction with the following drawings, in which:

FIG. 13 illustrates macroblocks in a picture frame or graphics frame;

DETAILED DESCRIPTION OF THE PREFERRED EMBODIMENT

Video Compression System

Figure 1:
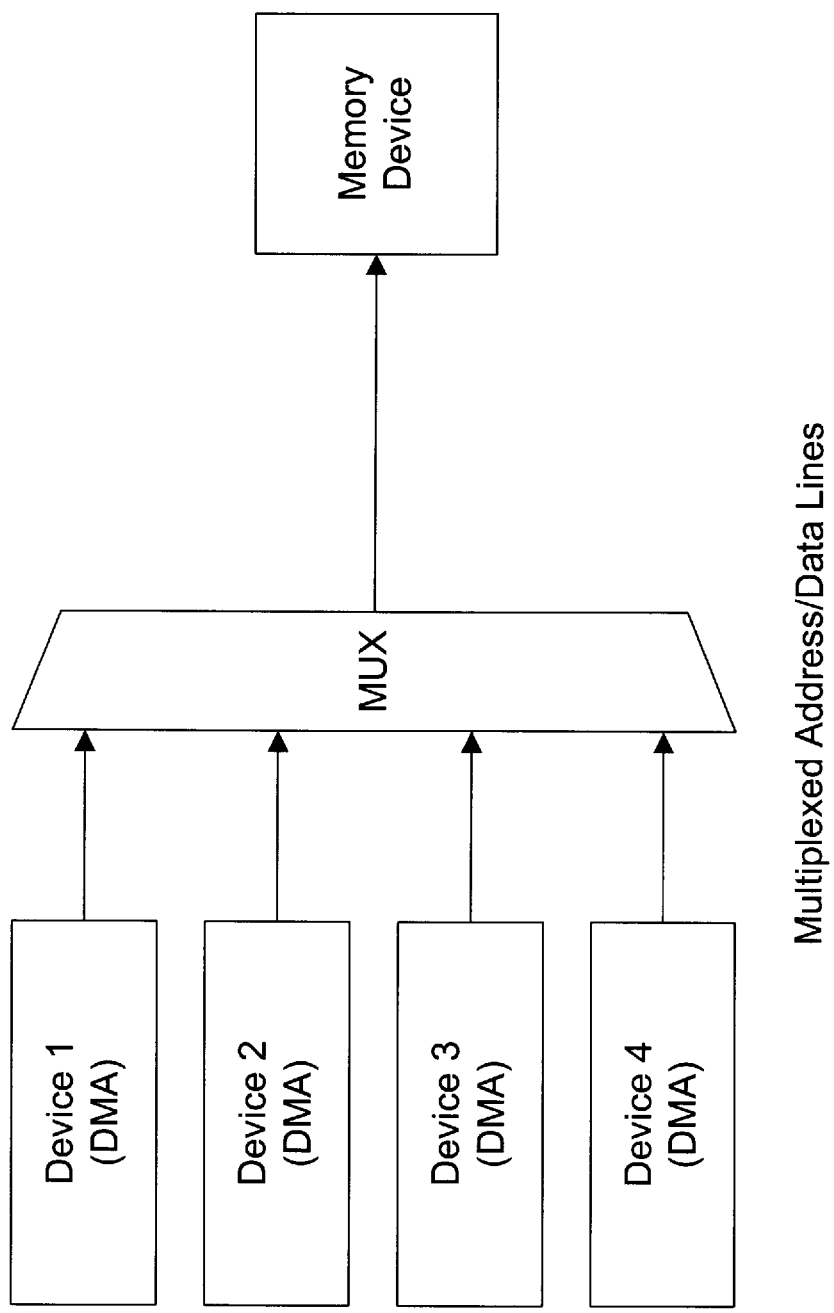
FIG. 1 illustrates a multiplexed memory interface according to the prior art.
Figure 2:
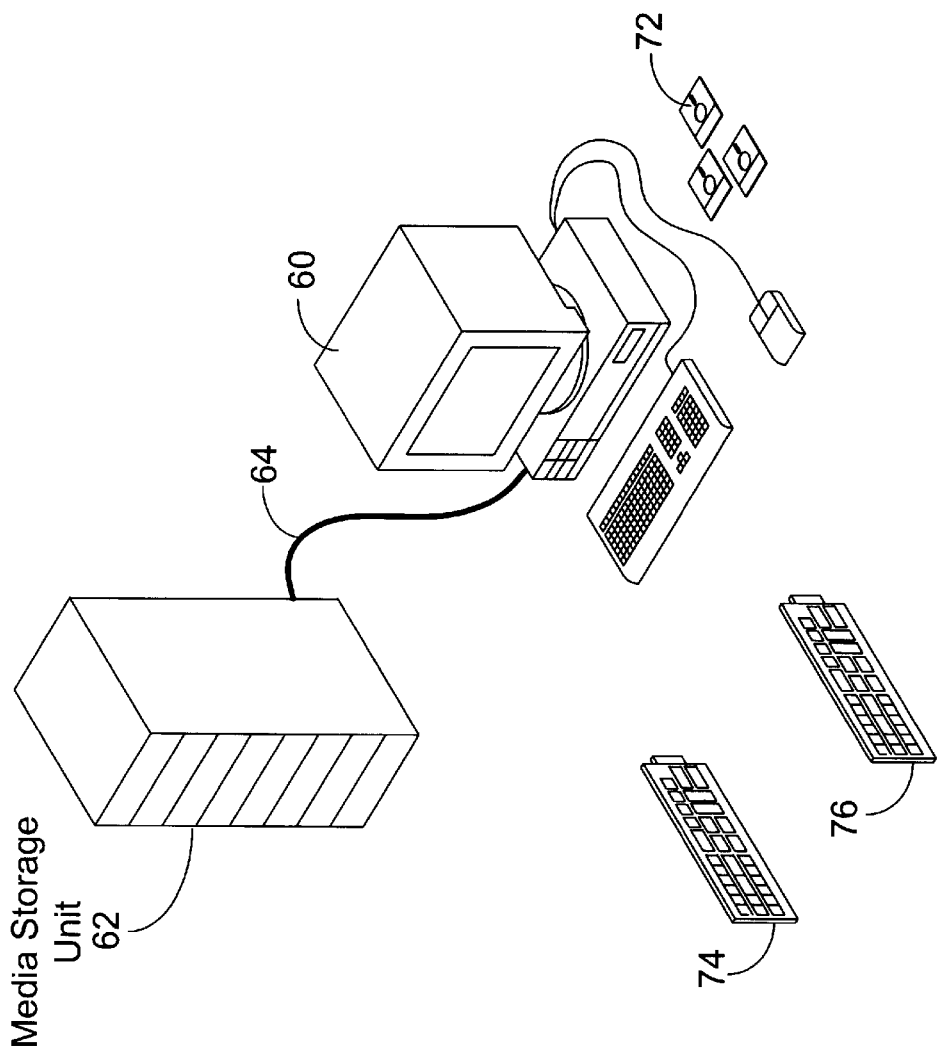
FIG. 2 illustrates a computer system having MPEG video decoding logic which includes a frame memory interface architecture according to the present invention.

Referring now to FIG. 2, a system for performing video decoding or decompression including a frame memory interface according to the present invention is shown. The system of the present invention performs motion compensation between temporally compressed frames of a video sequence during video decoding or video decompression. In other words, the system of the present invention receives motion estimation vectors representing blocks of a video frame and restores the compressed data during video decompression. However, the present invention may be used as a memory interface in any of various types of applications, as desired.

As shown, in one embodiment the video decoding or decompression system comprises a general purpose computer system 60. The video decoding system may comprise any of various types of systems, including a computer system, set-top box, television, or other device.

The computer system 60 is preferably coupled to a media storage unit 62 which stores digital video files which are to be decompressed or decoded by the computer system 60. The media storage unit 62 may also store the resultant decoded or decompressed video file. In the preferred embodiment, the computer system 60 receives a compressed video file or bitstream and generates a normal uncompressed digital video file. In the present disclosure, the term "compressed video file" refers to a video file which has been compressed according to any of various video compression algorithms which preferably use motion estimation techniques, including the MPEG standard, among others, and the term "uncompressed digital video file" refers to a stream of decoded or uncompressed video.

As shown, the computer system 60 preferably includes a video decoder 74 which performs video decoding or decompression operations. The video decoder 74 is preferably an MPEG decoder. The computer system 60 optionally may also include an MPEG encoder 76. The MPEG decoder 74 and MPEG encoder 76 are preferably adapter cards coupled to a bus in the computer system, but are shown external to the computer system 60 for illustrative purposes. The computer system 60 also includes software, represented by floppy disks 72, which may perform portions of the video decompression or decoding operation and/or may perform other operations, as desired.

Figure 3:
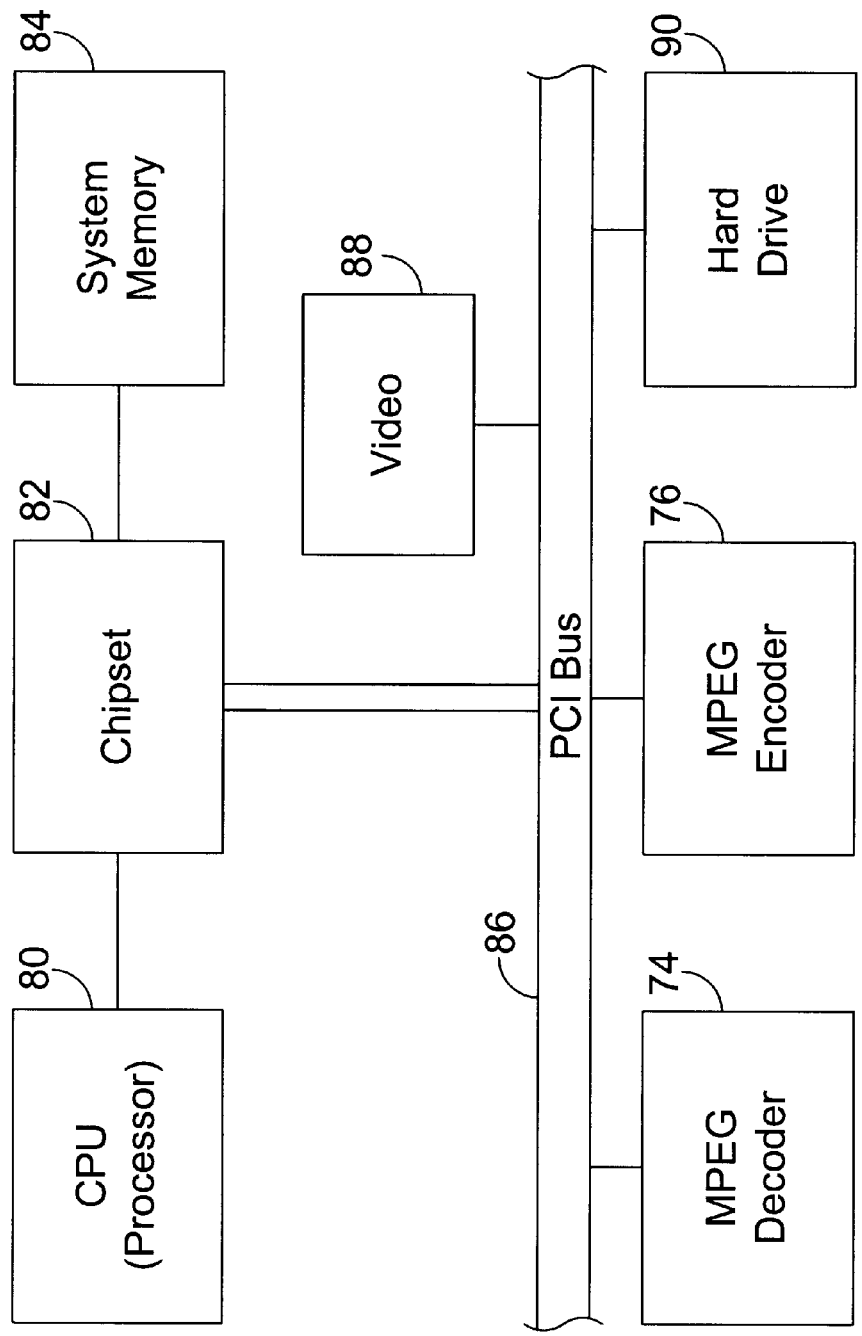
FIG. 3 is a block diagram illustrating the computer system of FIG. 2.

The computer system 60 preferably includes various standard components, including one or more processors, one or more buses, a hard drive and memory. Referring now to FIG. 3, a block diagram illustrating the components comprised in the computer system of FIG. 2 is shown. It is noted that FIG. 3 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 3, MPEG decoder 74 and MPEG encoder 76 are shown connected to PCI bus 86. Various other components may be comprised in the computer system, such as video 88 and hard drive 90.

As mentioned above, in the preferred embodiment of FIG. 2 the computer system 60 includes or is coupled to one or more digital storage or media storage devices. For example, in the embodiment of FIG. 2, the computer system 60 couples to media storage unit 62 through cable 64. The media storage unit 62 preferably comprises a RAID (Redundant Array of Inexpensive Disks) disk array, or includes one or more CD-ROM drives and/or one or more Digital Video Disk (DVD) storage units, or other media, for storing digital video to be decompressed and/or for storing the resultant decoded video data. The computer system 60 may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the compressed digital video file may be received from an external source, such as a remote storage device or remote computer system. In this embodiment, the computer system preferably includes an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the MPEG decoder 74 in the computer system 60 performs video decoding or video decompression functions. In performing video decoding or video decompression, the MPEG decoder 74 receives temporally compressed frames comprising motion vectors and uses motion compensation techniques to decompress or decode the compressed frames of the digital video file.

As discussed further below, the MPEG decoder 74 in the computer system 60 stores prior decoded frames in a memory in one or more frame storage formats. These different frame storage formats allow, for example, efficient access of desired reference blocks with reduced page crossings. The MPEG decoder 74 preferably stores frames or pictures in either a raster scan format, a tiled format, or a skewed tile format. The MPEG decoder 74 may also store frames in other formats, as desired. The MPEG decoder 74 includes a frame memory interface which is easily adaptable and/or re-configurable and thus performs various decoding, display, and graphics functions with improved efficiency and guaranteed performance according to the present invention.

It is noted that the system for decoding or decompressing video data may comprise two or more interconnected computers, as desired. The system for decoding or decompressing video data may also comprise other hardware, such as a set top box, either alone or used in conjunction with a general purpose programmable computer. It is noted that any of various types of systems may be used for decoding or decompressing video data according to the present invention, as desired.

Figure 4:
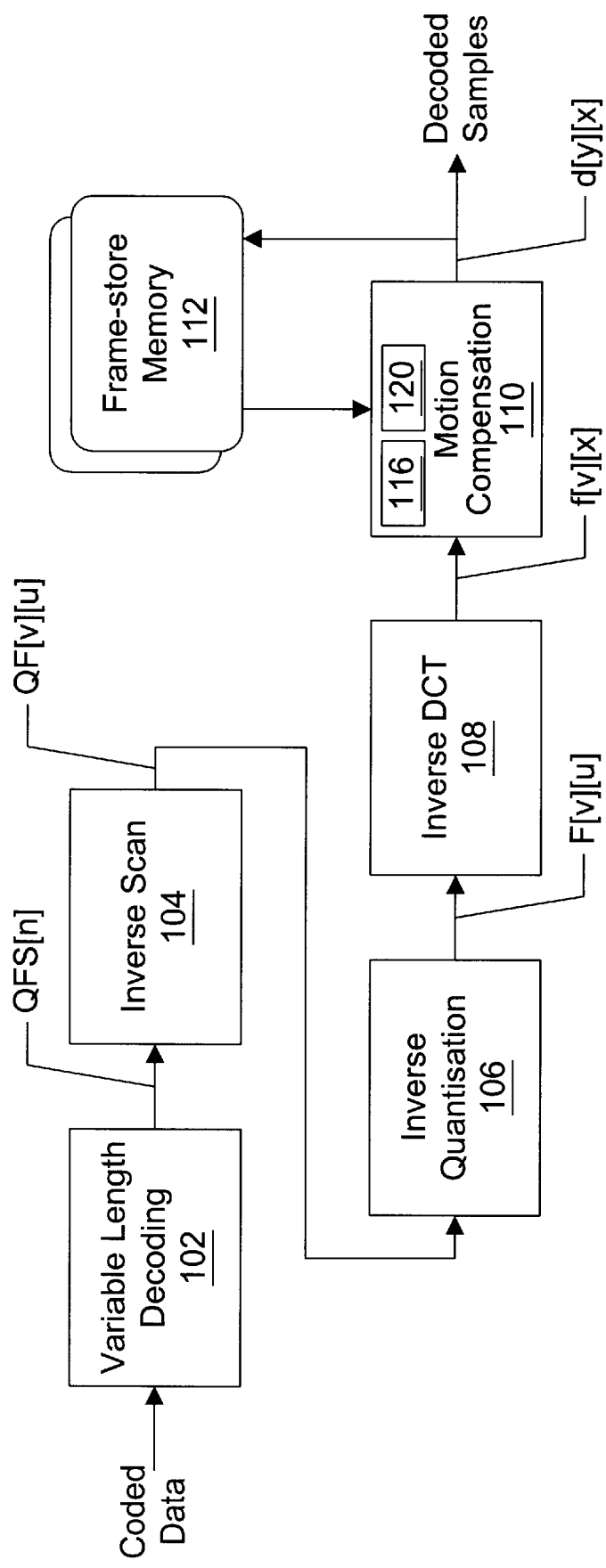
FIG. 4 is a block diagram illustrating an MPEG decoder according to one embodiment of the present invention.

FIG. 4—MPEG Decoder Block Diagram

Referring now to FIG. 4, a block diagram illustrating one embodiment of the MPEG decoder 74 which includes a frame memory interface according to the present invention is shown. In one embodiment, the frame memory interface is used in motion compensation logic comprised in MPEG decoder 74.

As shown, the video decoder 74 receives an encoded or compressed digital video stream and outputs an uncompressed digital video stream. The compressed digital video stream is a bitstream of compressed video data which is used to present a video sequence, such as a television segment or movie, onto a screen, such as a television or a computer system. In the preferred embodiment, the compressed digital video stream is compressed using the MPEG-2 compression algorithm, and the video decoder 74 is thus preferably an MPEG-2 decoder. Since the operation of MPEG decoders is well known in the art, details of their operation which are not necessary to the operation of the present invention are omitted for simplicity.

As shown in FIG. 4, the MPEG decoder 74 comprises a Variable Length Decoding block 102 coupled to provide an output to an Inverse Scan block 104, which is coupled to provide an output to an Inverse Quantization block 106, which is coupled to provide an output to an Inverse DCT block 108, which is coupled to provide an output to a motion compensation block 110. The motion compensation block 10 provides an output comprising decoded samples. A frame store memory or external memory 112 is coupled to the output of the motion compensation block 110 to receive and store decoded frame data. The motion compensation block 110 is coupled to an output of the frame store memory 112 to receive reference block data from the frame store memory 112 during motion compensation.

As shown in FIG. 4, the Variable Length Decoding block 102 receives coded data and performs variable length decoding. As is well known, the MPEG standard provides that data is compressed for transmission using variable length codes. Thus the Variable Length Decoding block 102 decodes this data and produces an output, referred to as QFS[n]. The QFS[n] output of the Variable Length Decoding block 102 is provided to the Inverse Scan block 104. The Inverse Scan block 104 reverses the zig zag scan ordering of the received data (is this right) and produces an output referred to as QF[v][u]. The output QF[v][u] is provided to the Inverse Quantization block 106. The Inverse Quantization block 106 performs inverse quantization or de-quantizes the data to produce de-quantized data, referred to as F[v][u]. The output F[v][u] of the Inverse Quantization block 106 is provided to the Inverse DCT block 108, which performs the inverse discrete cosine transform to convert the data from the frequency domain back to the pixel domain. The inverse DCT block 108 produces an output referred to as f[y][x]. The output f[y][x] of the inverse DCT block 108 is provided to the motion compensation block 110.

The output f[y][x] from the inverse DCT block 108 comprises temporally encoded frames of pixel data. The motion compensation block 110 decompresses the temporally compressed frames using motion compensation techniques. As described above, an MPEG encoded stream comprises I, P and B frames. P and B frames are temporally compressed relative to other frames. P frames are temporally compressed relative to prior I or P frames, and B frames are temporally compressed relative to prior or subsequent I or P frames. When a frame is temporally compressed, the frame is partitioned into macroblocks, referred to as target blocks, and then the compression method searches in neighboring frames for blocks which are most similar to the block being encoded. When the best fit block is found, the respective target block is encoded by a motion vector which points to this best fit reference block in the reference frame. The difference between the block being encoded and the best fit block is also computed and transferred in the MPEG stream.

Output pixel values from the motion compensation block 110 are provided to a frame store memory 112. The frame store memory 112 is thus coupled to the motion compensation block 110 and stores one or more reference frames of video data. These reference frames of video data are used in performing motion compensation or reconstruction on temporally compressed frames, such as P and B frames. In general, an MPEG stream includes encoded reference frame data which is transmitted before temporally compressed data that depends on the prior transmitted reference frame data. Thus, incoming temporally encoded frame data, such as P and B frame data, comprises motion vectors which point to reference blocks in a prior transmitted reference frame of video data, which has been stored in the frame store memory 112. The motion compensation block 110 analyzes each motion vector from the incoming temporally compressed data and retrieves a reference block from the frame store memory 112 in response to each motion vector. The motion compensation block 110 includes a local memory or on-chip memory 116 which stores the retrieved reference block. The motion compensation block 110 then uses this retrieved reference block to decompress the temporally compressed data.

In the preferred embodiment, the frame store memory 112 is 1M×16 SDRAM, such as Samsung KM416S1120AT-12, having an operating frequency of 67.5 MHz and a burst size of 4 words. The frame store memory 112 is preferably a paged memory which stores data in a plurality of pages. As is well known, paged memories typically utilize a row address strobe (RAS) and a column address strobe (CAS) to access data within the respective pages. As is also well known, when data is accessed within a page, the memory accesses occur quickly because the row address strobe (RAS) and column address strobe (CAS) are common, and no wait states are required. However, when a page miss or page crossing occurs, i.e., when data is required which is located on a different page than the page currently being accessed, then a new RAS and CAS are required, which requires wait states. This increases the memory access latency and thus reduces performance.

Figure 14:
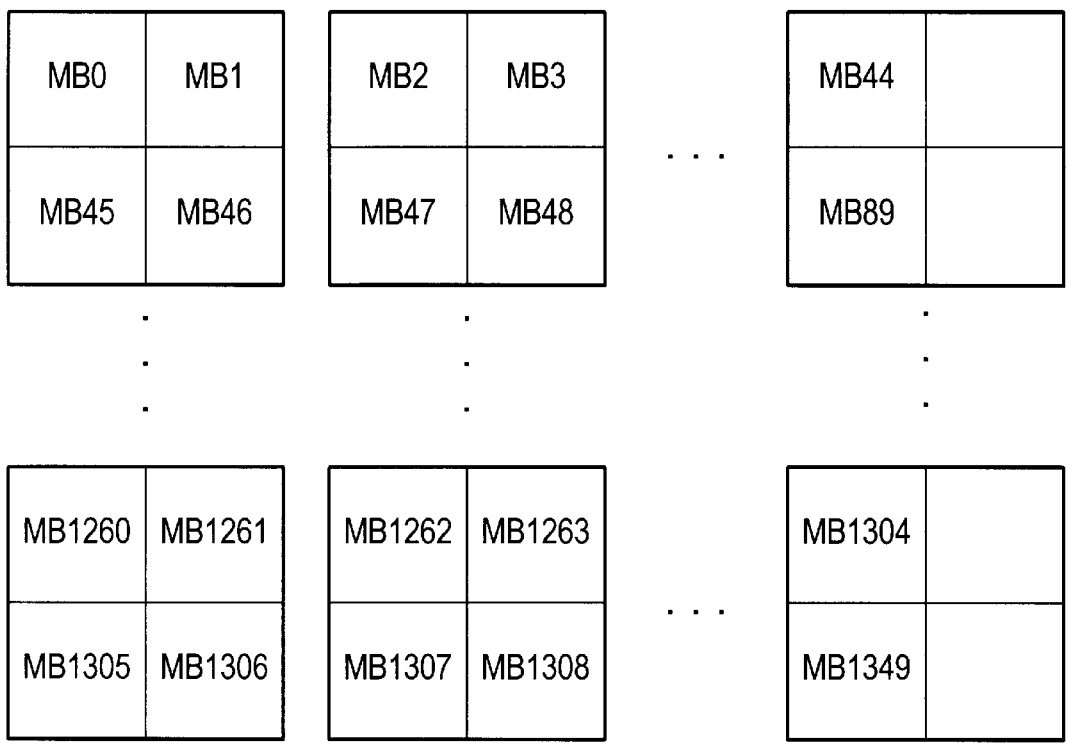
FIG. 14 illustrates storage of reference frame macroblocks according to a tiled arrangement.
Figure 15:
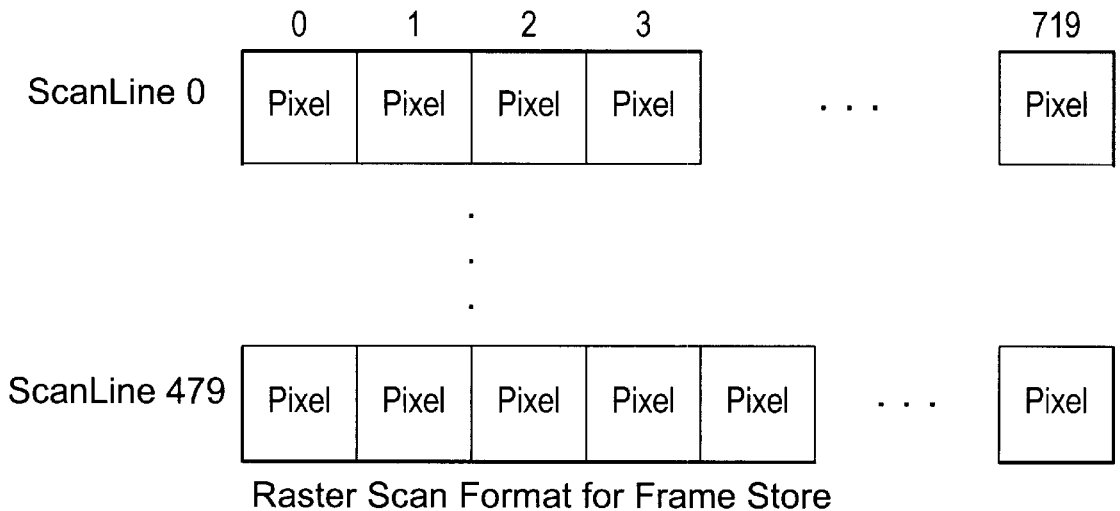
FIG. 15 illustrates storage of a reference frame according to a raster scan arrangement.
Figure 16:
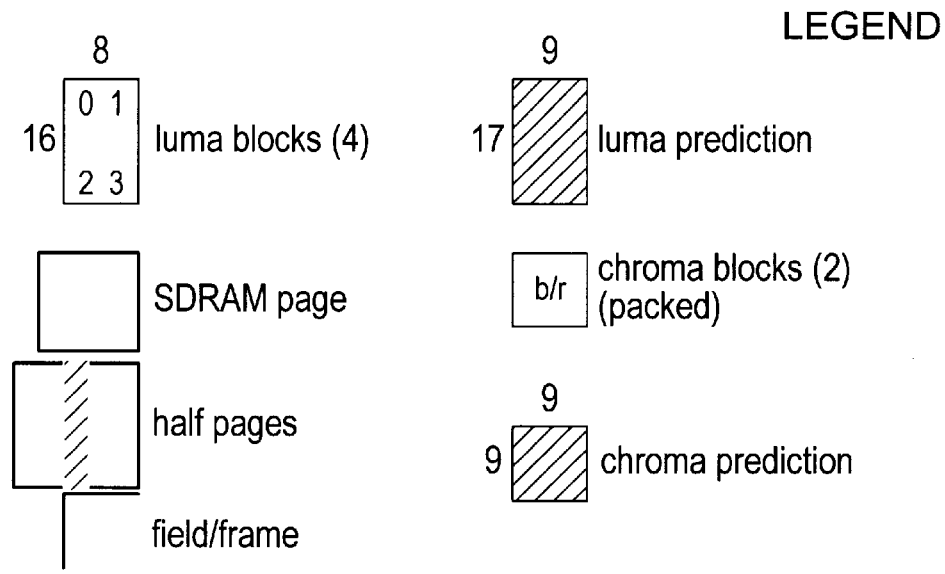
FIGS. 16–16a–16d illustrates storage of reference frame macroblocks according to a skewed tile or T-tile arrangement.

According to the present invention, video frames, such as reference frames, are stored in the frame store memory 112 according to one of various formats. These various formats include a tiled arrangement, as shown in FIG. 14, a raster scan format as shown in FIG. 15, and a skewed tile arrangement as shown in FIG. 16. The skewed tile memory storage arrangement limits the maximum number of page crossings which occur in retrieving a reference block from the frame store memory 112.

As shown, the motion compensation logic 110 includes a memory controller 120 which accesses a reference block from the frame store memory 112 based upon a received motion vector in a temporally compressed frame. As discussed further below, each slave device which stores data in the frame store memory 112 pre-configures data in one or more registers which specify how data is to be read or written from the memory 112. The memory controller 120 reads register data from a slave device and intelligently accesses the entire portion of a reference block from each respective memory page where the data resides to minimize the number of page crossings required. The memory controller 120 can thus read or write data according to different formats based on pre-configured slave registers.

Figure 5:
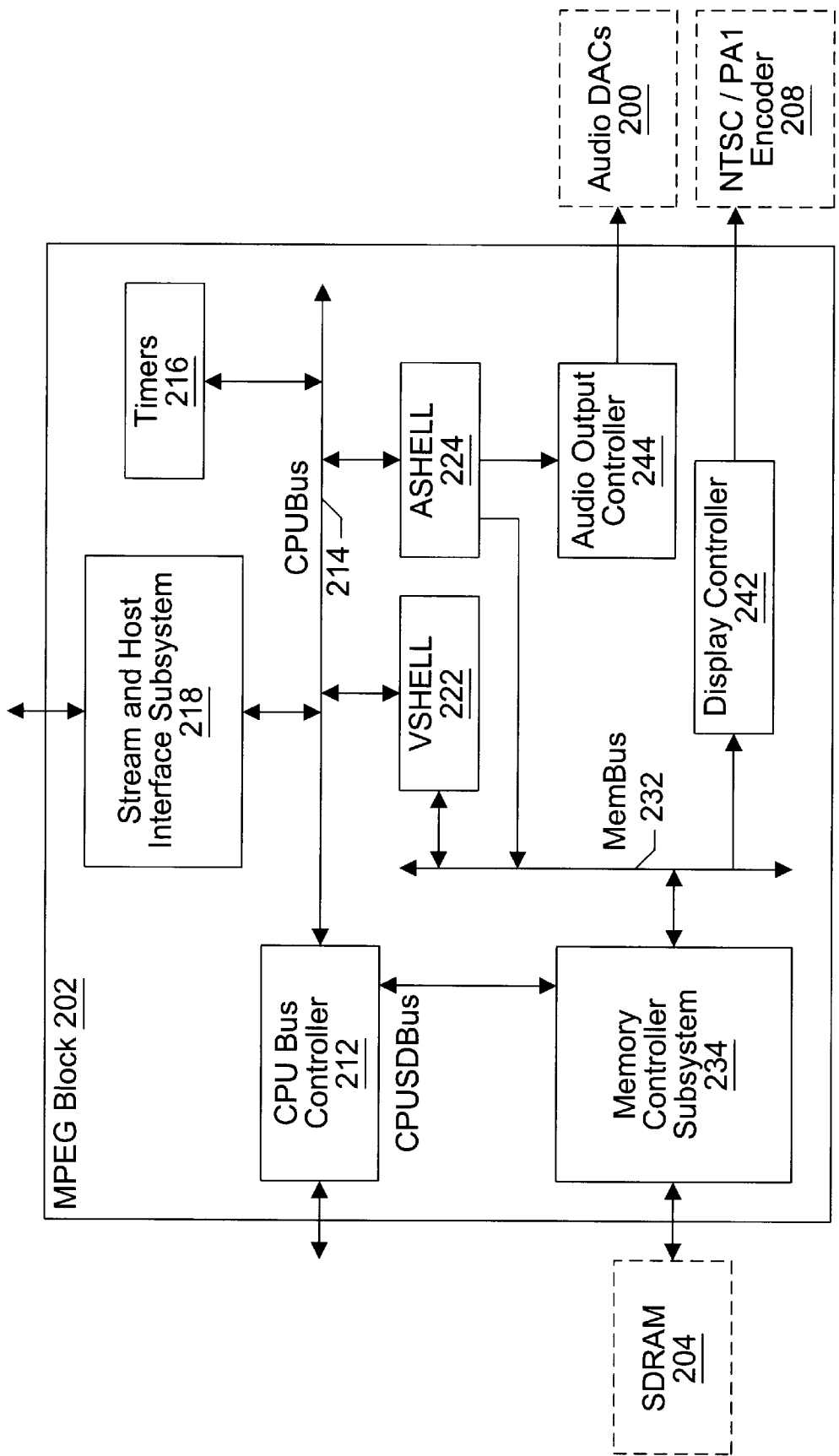
FIG. 5 is a block diagram illustrating an MPEG decoder according to the preferred embodiment of the present invention.
Figure 6:
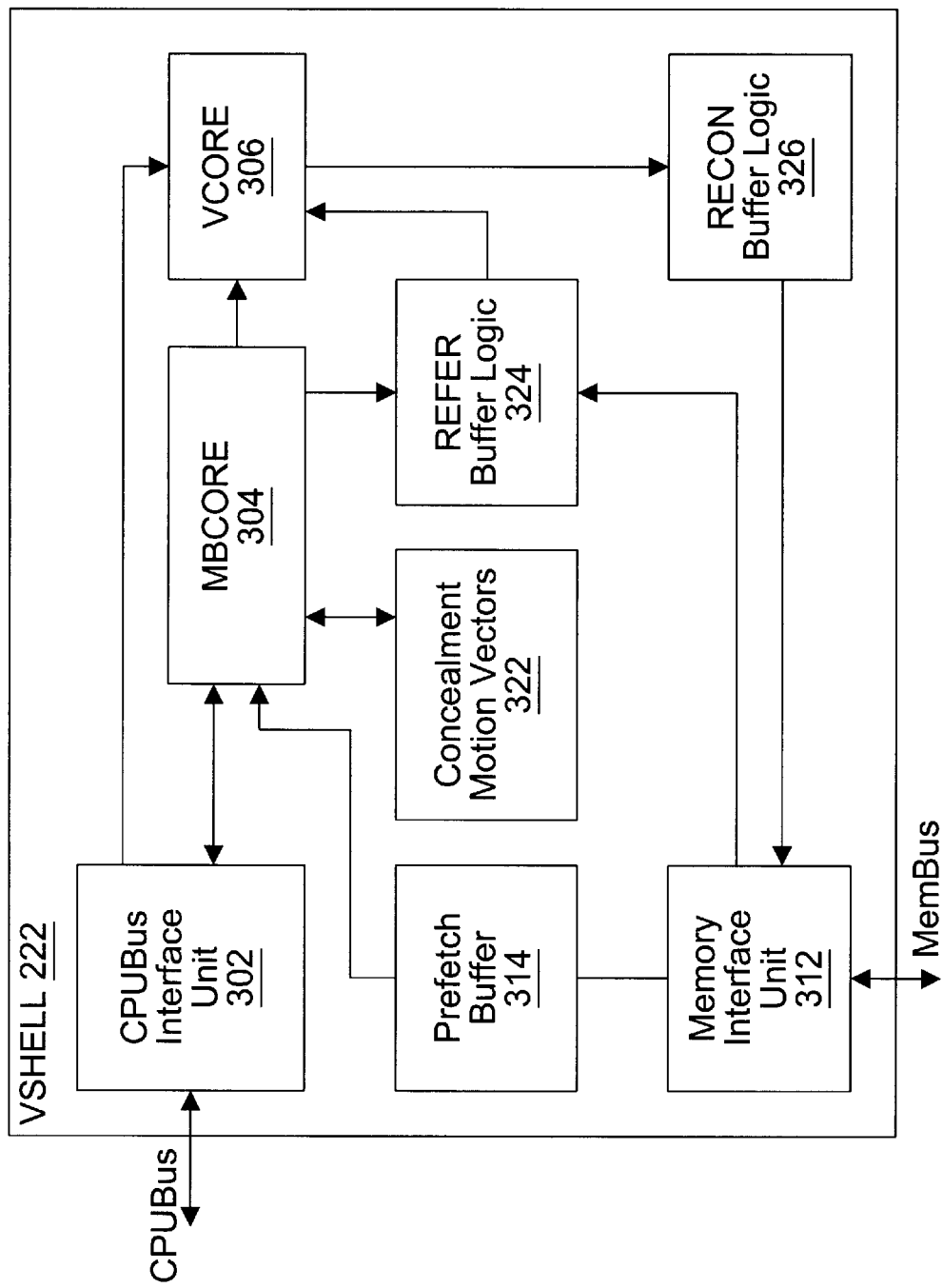
FIG. 6 illustrates the VSHELL logic in the MPEG decoder of FIG. 5.

FIGS. 5 and 6—MPEG Decoder Block Diagram of the Preferred Embodiment

Referring now to FIG. 5, a block diagram illustrating an MPEG decoder architecture according to the preferred embodiment of the present invention is shown. As shown, the MPEG decoder in this embodiment comprises an MPEG block 202. The MPEG block 202 couples to an external memory 204. As shown, the external memory 204 is preferably Synchronous Data RAM (SDRAM), although it is noted that other memory may be used. The external memory 204 is also preferably a paged memory. The MPEG block 202 may also couple to audio digital-to-analog converters (audio DACs) 206 and an NTSC (National Television Standards Committee)/PAL encoder 208.

As shown, the MPEG block 202 includes a CPU bus controller 212 for coupling to an external CPU, such as CPU 80, The CPU bus controller 212 couples to a CPU bus 214. Timers 216 and a stream and host interface subsystem 218 are coupled to the CPU bus 214. The stream and host interface subsystem 218 is adapted for receiving MPEG streams from an external device (not shown). A video shell block (VSHELL) 222 is also coupled to the CPU bus 214. As discussed further below, the VSHELL block 222 includes a video processing core and a macroblock processing core, as well as reconstruction buffer logic and reference buffer logic. An audio shell block (ASHELL) 224 is also coupled to the CPU bus 214. The audio shell block 224 includes an audio processing core in addition to a CPU bus interface, memory bus interface, and input/output interfaces.

The VSHELL block 222 couples through a memory bus 232 to a memory controller subsystem 234. The memory controller subsystem 234 also couples to the CPU bus controller 212. The memory controller subsystem 234 includes memory controller logic which interfaces to the external memory 204. The ASHELL block 224 also couples to the memory bus 232 as shown. A display controller 242 is coupled to the memory bus 232 and provides an output to the NTSC/PAL encoder 208. The ASHELL block 224 provides an output to an audio output controller 244 which in turn provides an output to the audio DACs 206.

As discussed further below, the memory controller subsystem 234 comprises memory controller logic for accessing the memory 204. The memory controller logic in the memory controller subsystem 234 operates to read programmed data from a slave device and perform memory transfers according to a desired frame storage format according to the invention.

Referring now to FIG. 6, a block diagram illustrating the video shell (VSHELL) logic 222 is shown. As shown, the VSHELL logic 222 includes a CPU bus interface unit 302 for coupling to the CPU bus 214 (FIG. 5). The CPU bus interface unit 202 couples to a macro block processing core (MBCORE) 304 and also couples to a video processing core (VCORE) 306.

The VSHELL block 222 also includes a memory interface unit 312 for coupling to the memory bus 232 (FIG. 5). The memory interface unit 312 couples through the memory bus to the memory controller subsystem 234, which in turn couples to the external memory or SDRAM 204. A pre-fetch buffer 314 couples to the memory interface unit 312, and the pre-fetch buffer 314 in turn couples to provide data to the macro block processing core 304. The pre-fetch buffer 314 is used to store data being fetched from the external memory 204 before its provided to the MBCORE 304.

The MBCORE 304 couples to a concealment motion vector block 322 as shown. The MBCORE 304 also couples to reference buffer logic 324 as shown and provides macroblock data to the reference buffer logic 324. The MBCORE 304 preferably performs MPEG decoding of macroblocks within a frame, as is known in the art. Since the operation of the MBCORE 304 is not necessary for an understanding of the present invention, details of its operation are omitted for simplicity.

The reference buffer logic 324 also couples to receive reference frame data from the memory interface unit 312. The reference buffer logic 324 is preferably used for storing one or more reference macroblocks used in motion compensation or frame reconstruction.

The VCORE block 306 preferably includes a processing pipeline for performing MPEG video decoding. The VCORE block 306 preferably includes inverse quantization logic and one or more inverse DCT block for performing the inverse discrete cosine transform. The VCODRE block 306 also includes motion compensation logic for performing motion compensation. Since the operation of the VCORE 306 is not necessary for an understanding of the present invention, details of its operation are omitted for simplicity.

The reference buffer logic 324 is also coupled to the VCORE block 306 and provides reference frame macroblock data to the VCORE block 306. The VCORE block 306 is coupled to reconstruction buffer logic 326 as shown. The VCORE logic 306 performs video decoding functions including motion compensation or frame reconstruction. In performing motion compensation logic, the VCORE 306 accesses reference blocks comprised in the reference buffer logic 324 and uses these blocks to reconstruct temporally compressed frames, which are then stored in a reconstruction buffer logic 326. The reconstruction buffer logic 326 also couples to the memory interface unit 312 for providing a reconstructed block or frame out to the memory bus 232.

Figure 7:
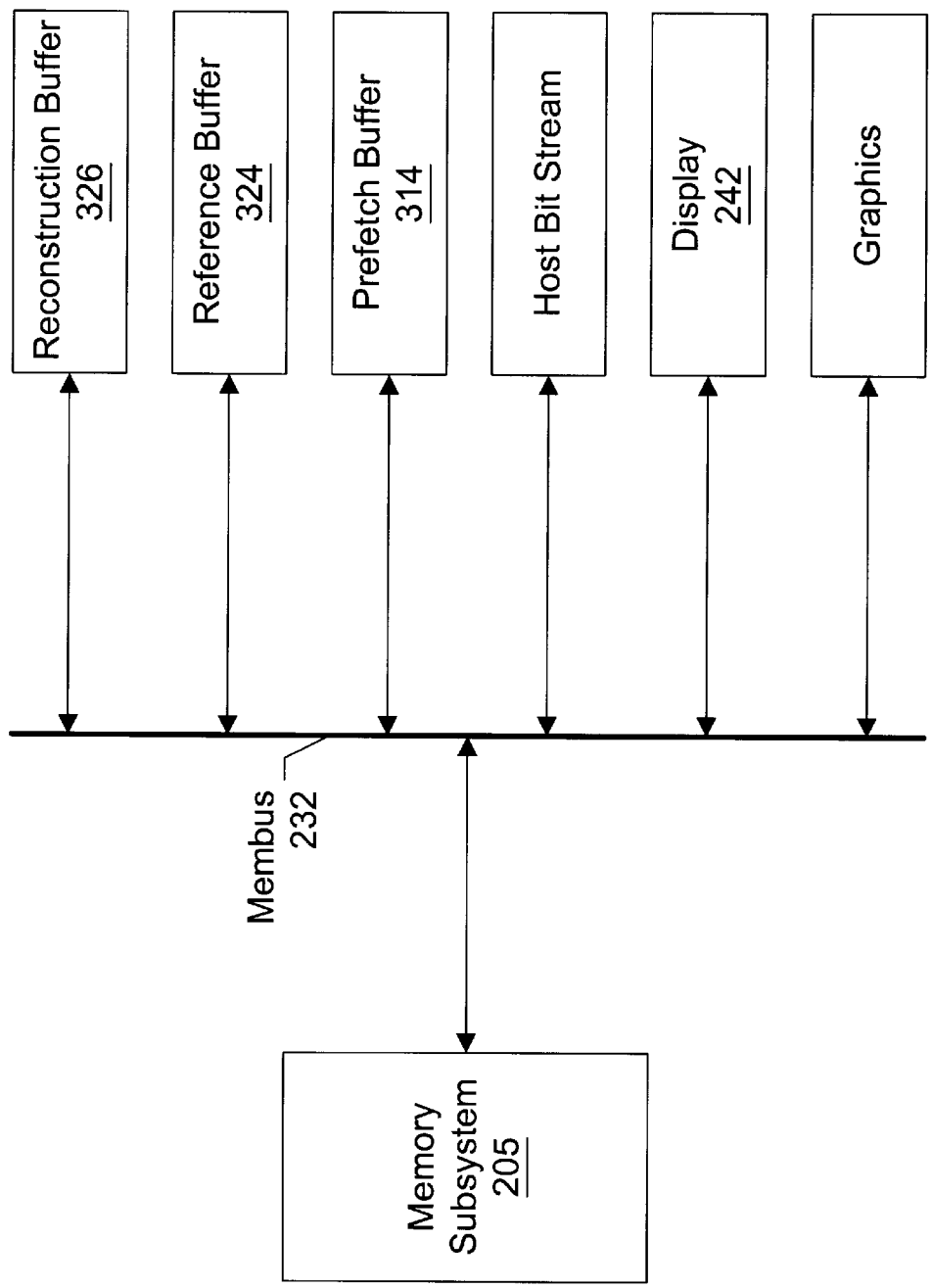
FIG. 7 illustrates the MPEG/graphics frame memory interface in the MPEG decoder of FIG. 5.

FIG. 7—MPEG/Graphics Frame Memory Interface

Turning now to FIG. 7, a block diagram illustrating the frame memory interface is shown for the system illustrated in FIGS. 5 and 6. FIG. 7 illustrates the various logical blocks or buffer logic which have a memory interface to the memory subsystem 205. In FIG. 7, the memory subsystem 205 comprises the memory controller 234 and SDRAM 204.

As shown, the reconstruction buffer 326, the reference buffer 324, and the prefetch buffer 314 comprised in the VSHELL block 222 couple through the memory bus 232 to the memory subsystem 205. As shown in FIG. 6, the reconstruction buffer 326, the reference buffer 324, and the pre-fetch buffer 314 comprised in the VSHELL block 222 each couple to the memory interface unit 312 (FIG. 6), through the memory bus 232 and hence to the memory subsystem comprising the SDPAM 204.

The display controller 242 comprised in the MPEG block also couples to the memory bus 232 to the memory subsystem 204. Also, a host bitstream and graphics bitstream provided from one of either the CPU bus controller 212 or the stream and host interface subsystem 218 is provided through the memory bus 232 to the memory subsystem 204.

Therefore, a plurality of logical elements are coupled through the memory bus 232 to the memory subsystem 205. These different blocks may generally desire to store picture or frame data in the memory 204 in different formats. For example, it is desirable for the reference buffer logic 324 to store reference frame data in the memory 204 in either a tiled or skewed tile format to minimize page crossings as discussed above. In contrast, the display block 242 preferably stores data in the memory 204 in a raster scan format for convenient display of the video data on a television or video monitor or other device. Each of the other blocks shown in FIG. 7 may also desire to store frame or picture data in the memory 204 in a certain desired format.

According to the preferred embodiment of the invention, the system of the present invention includes a frame memory interface which accommodates different MPEGs/graphics frame store architectures while also maximizing memory bandwidth utilization. This frame memory architecture interface also facilitates reduction of overhead associated with page switching or page crossing in paged memory such as DRAMs, SDRAMs, and SGRAMs, etc.

In the preferred embodiment, each of the devices in FIG. 7 which are coupled to the memory subsystem 205 includes one or more registers which are programmable to store or retrieve data in the memory 204 according to a desired storage format. In one embodiment, the respective slave device is configured to store or retrieve data in either a raster scan format or a macroblock format. In this embodiment, the slave device includes one or more registers for storing various fields, including a number of bytes per row field, a skip byte value field, a number of rows field, a start address value field, and a local buffer start address field. In another embodiment, the slave device can store or retrieve data in any of various types of formats.

Figure 8:
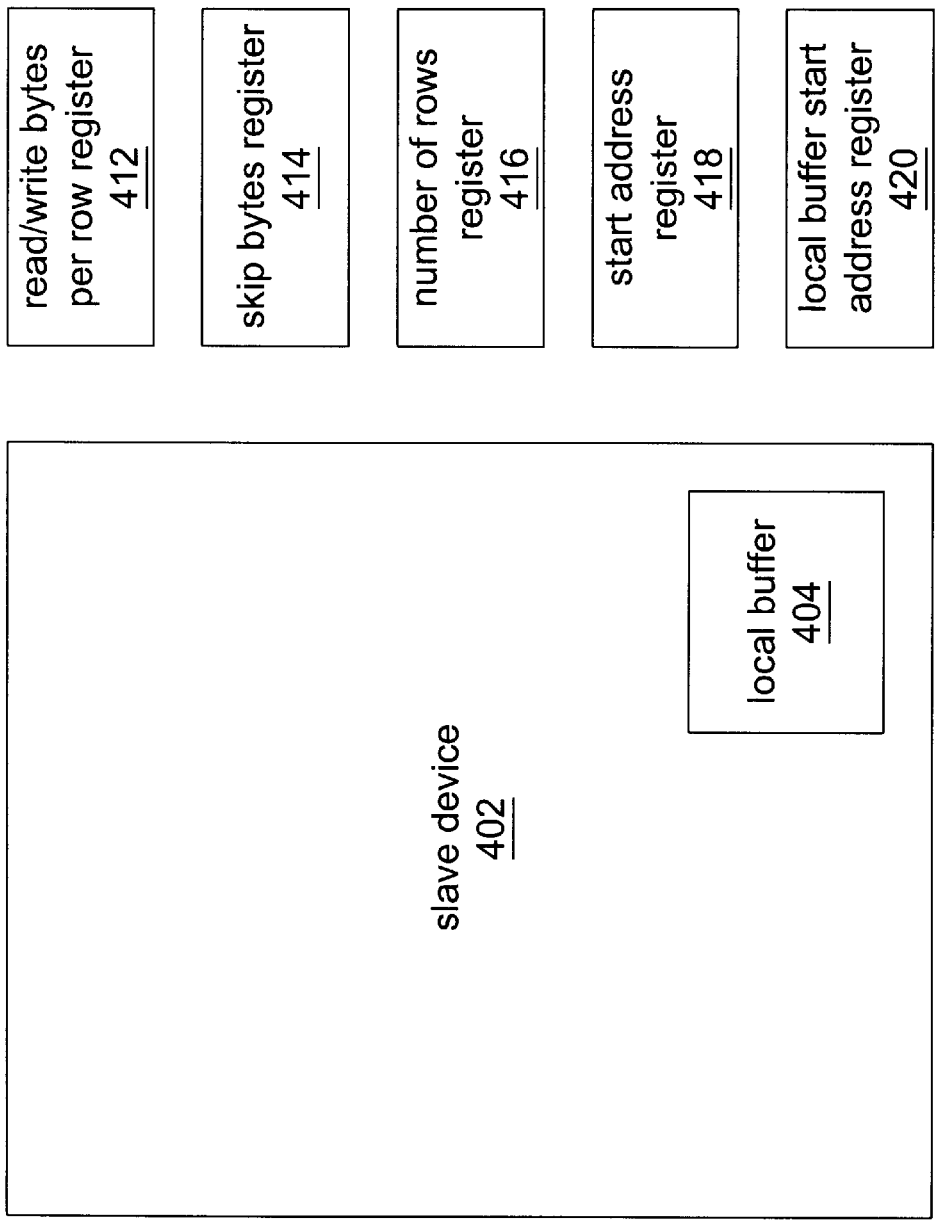
FIG. 8 illustrates a slave device including various registers in the MPEG decoder of FIGS. 5 and 6 according to one embodiment.

FIG. 8—Slave Device

Referring now to FIG. 8, a block diagram illustrating a slave device 402 which is adapted for coupling to the memory bus 232 and hence to the memory subsystem 204 is shown. The slave device 402 represents one of the devices in FIG. 7, which is coupled to the memory subsystem 205. In the embodiment of FIG. 8, the slave device is configured to write and/or read data to the memory 204 according to various formats, including a raster scan format, a tiled format, and a skewed tile format, among others.

As shown, the slave device 402 includes one or more registers for storing various fields or memory transfer values. In the embodiment shown in FIG. 8, the slave device 402 includes a separate register for each respective field. However, it is noted that the slave device 402 may include or comprise one or more registers which each store one or more of the respective fields as desired.

As shown, the slave device 402 includes a read/write bytes per row register 412 for storing the number of bytes to be read or written in a row. This value is used, for example, where a page in the memory stores one or more adjacent macroblocks in a row, and the slave device 402 desires to only read or write pixels from a portion of the one ore more respective macroblocks.

The slave device 402 includes a skip bytes register 414 for storing the number of bytes to be skipped in a row. This value indicates the number of bytes to be skipped for each row after a read or write is performed to the respective row. This value is used in the example mentioned above, where the slave device 402 is only reading a portion of a macroblock in a page and is not reading the data all the way to the end of the page. Thus, the skip bytes register stores the value indicating the number of bytes to be skipped in each of the respective rows stored in the respective page being read or written to enable the addressing to properly return to the next position in the next adjacent row.

The slave device 402 also includes a number of rows register 416 which indicates the number of rows to be read/written. Slave device 402 further includes a start address register which indicates the page address and offset within the page of the SDRAM where the read/write operation is to begin. Finally, the slave device 402 includes a local buffer start address register 420 which stores the start address for the local buffers comprised on the slave device 402 where the data from the SDRAM 204 is to be read into or written from. The above values which are used to "set up" a memory transfer are referred to as memory transfer values.

Figure 9:
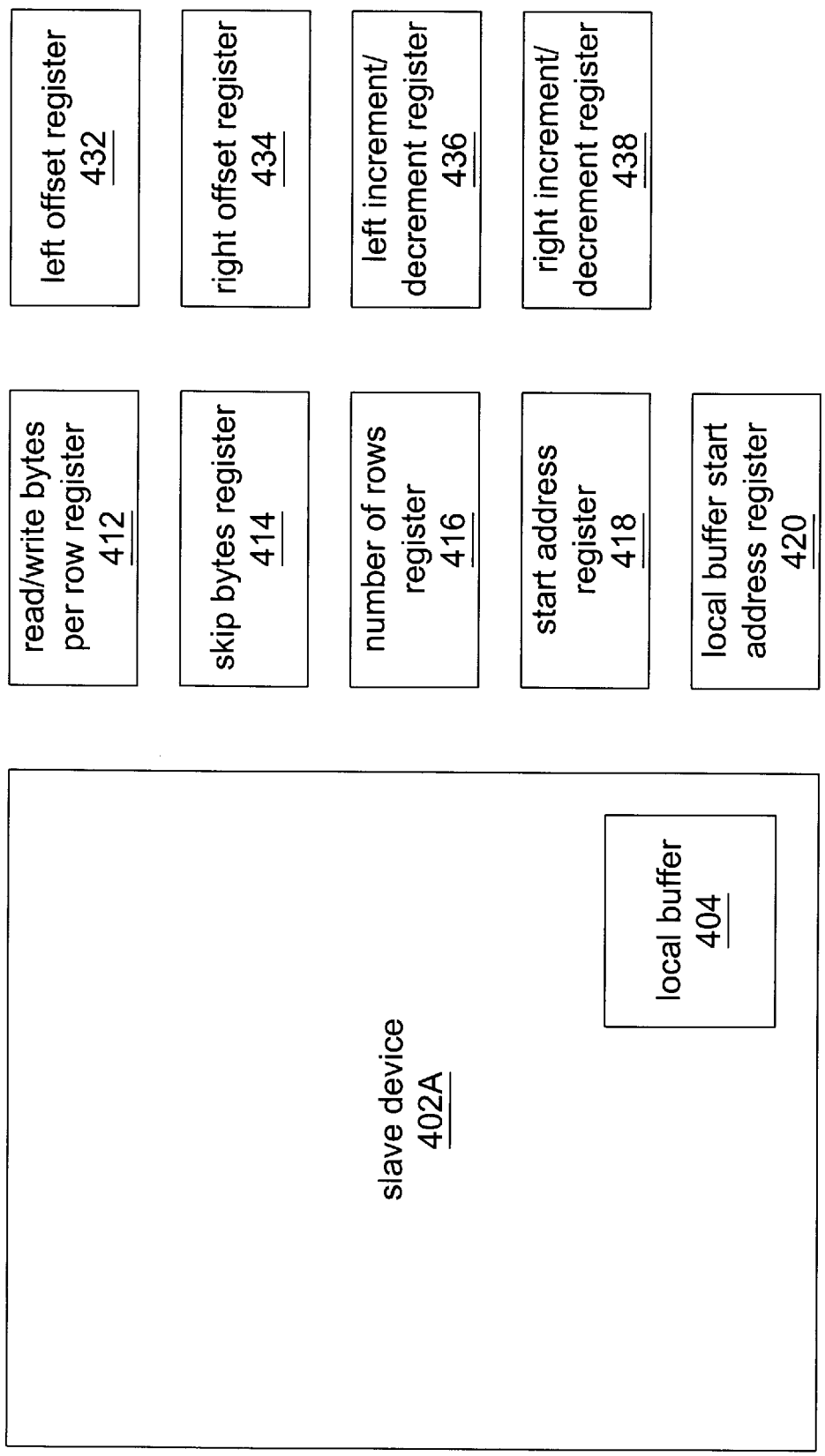
FIG. 9 illustrates a slave device including various registers in the MPEG decoder of FIGS. 5 and 6 according to an embodiment which is capable of transferring non-rectangular geometric shapes.

FIG. 9—Slave Device which Reads Non-rectangular Geometric Data

Figure 17:
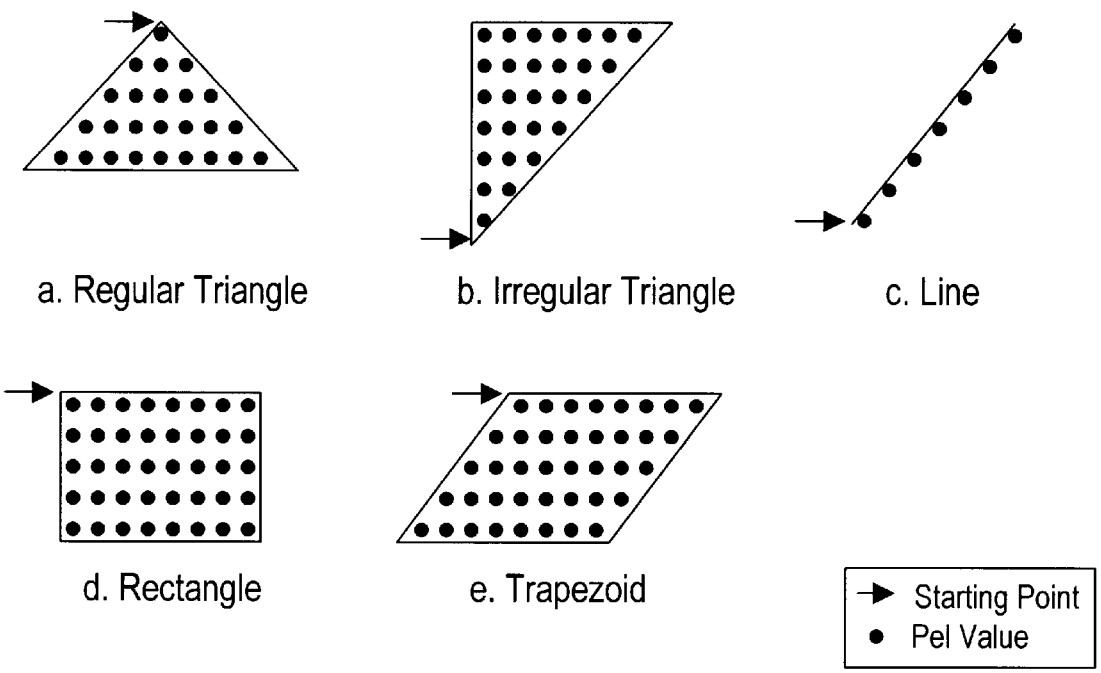
FIG. 17 illustrates various rectangular and non-rectangular geometric shapes which may be transferred according to the present invention.

Referring now to FIG. 9, a block diagram illustrating a slave device 402A according to an alternate embodiment is shown. In the embodiment of FIG. 9, the slave device 402A is adapted for reading/writing areas or objects which have an irregular shape, e.g., which are non-rectangular in shape. Examples of these shapes are shown in FIG. 17.

As shown in FIG. 9, the slave device 402A includes additional fields or registers for storing four additional values. In the embodiment shown in FIG. 9, the slave device 402A includes a different register for each respective field. However, as noted above, the slave device 402A may comprise one or more registers which store one more of the respective fields as desired.

As shown in FIG. 9, the slave device 402A includes the registers 412, 414, 416, 418 and 420 as described above. In addition to these registers, the slave device 402A also includes a left offset register 432 for storing the number of bytes to the left of the start address point. The slave device further includes a right offset register 434 for storing the number of bytes to the right of the start address point. The slave device 402A also includes a left increment/decrement register 436 for storing a value for increasing/decreasing progression for the left side of the object being read/written, and a right increment/decrement register 438 for storing a value indicating the increasing/decreasing progression for the right side of the object being written. As mentioned above, the above values which are used to "set up" a memory transfer are referred to as memory transfer values.

Figure 10:
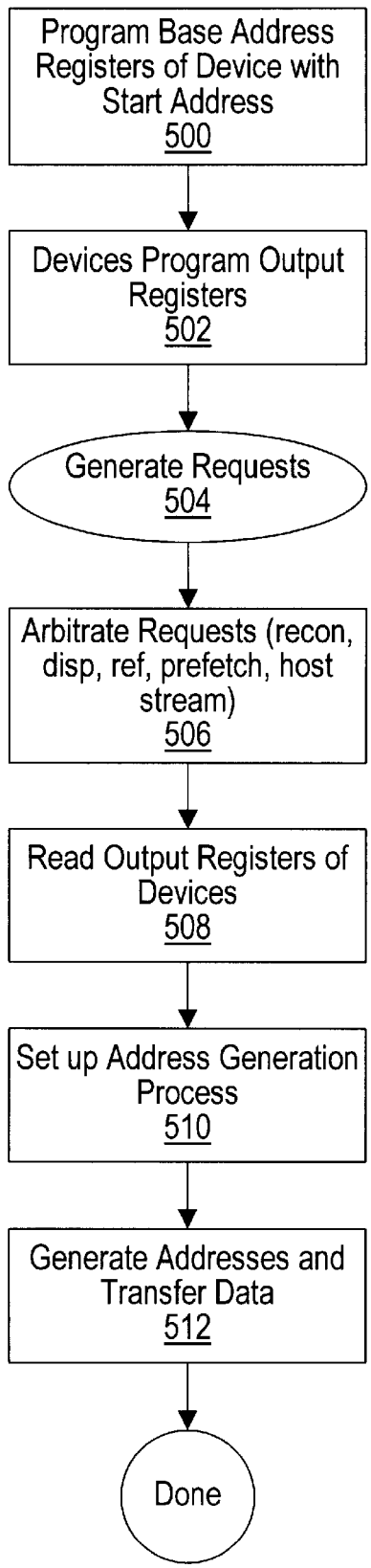
FIG. 10 is a flowchart diagram illustrating operation of a memory transfer.

FIG. 10—Flowchart Diagram of Memory Transfer Operation

Referring now to FIG. 10, a flowchart diagram is shown illustrating operation of the memory interface system of the present invention. Here it is assumed that one or more of the slave devices desire to perform a read or write operation to the memory 204. Slave devices may comprise any of the devices shown in FIG. 7, such as the reconstruction buffer 326, the reference buffer 324, the pre-fetch buffer 314, the host bitstream logic, the display logic 242 or graphics logic. The slave devices may be any of various types of devices, as desired.

As shown, in step 500 the CPU programs the base address registers of the devices with the start address for transactions. In step 502 one or more of the slave devices which desire to perform a read or write operation each programs its respective output registers. As discussed in FIGS. 11 and 12, each slave device programs its respective output registers with memory transfer values which indicate the desired portion of memory and/or the desired pixel data to be read/written.

In step 504 each of the respective slave devices which desire to perform a memory transfer operation generate requests to the memory subsystem. In step 506 arbiter logic comprised in the memory controller subsystem 234 arbitrates among the requests and grants control to a single requesting slave device. Thus, as shown in FIG. 7, the memory subsystem 205 receives request from, for example, the reconstruction buffer logic 326, the reference buffer logic 324, the display logic 242, the pre-fetch buffer 314 and the host bitstream logic, and grants one of the requests as shown.

In step 508 the memory controller 234 reads the memory transfer values from the output registers of the selected device. The memory controller 234 reads the memory transfer values to determine the video frame data that is to be read/written.

In step 510 the memory controller subsystem 234 sets up an address generation process to generate addresses according to the values stored in the output registers. In step 512 the memory controller subsystem 234 generates addresses according to the memory transfer values in the output registers and operates to transfer the data to/from the memory 204 depending upon whether the operation is a write or read operation, respectively.

Figure 11:
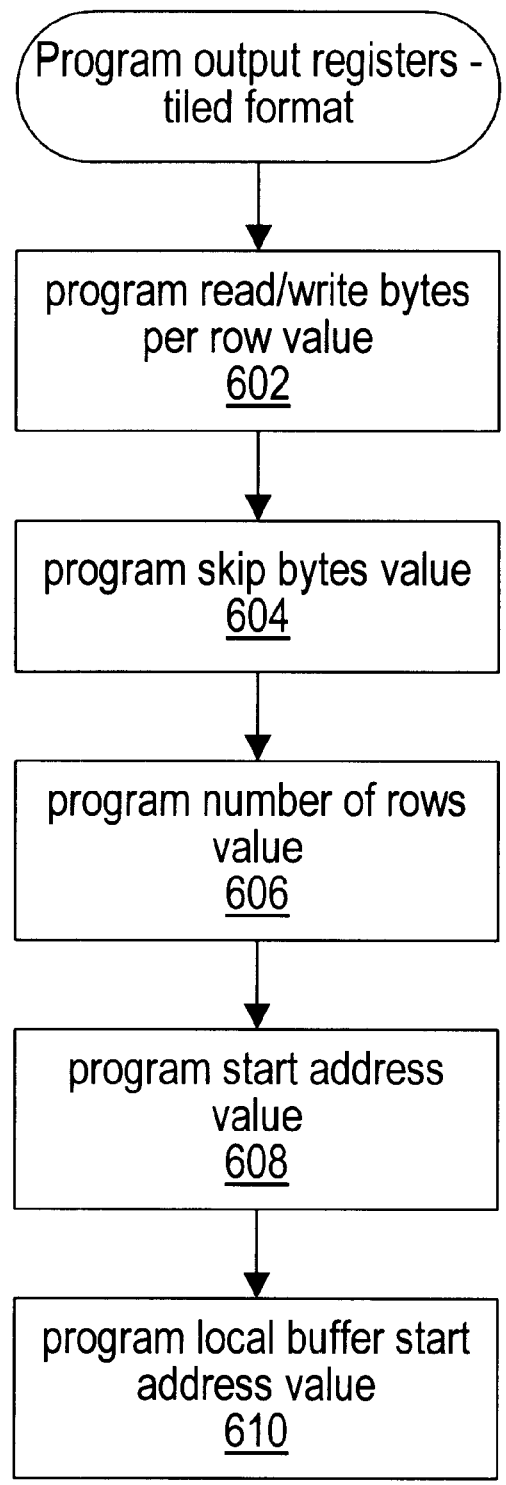
FIG. 11 is a flowchart diagram illustrating operation of a slave device programming memory transfer registers.

FIG. 11—Program Memory Transfer Values

FIG. 11 is a flowchart diagram illustrating operation of a slave device programming its output registers according to the embodiment of FIG. 8. In the embodiment of FIG. 11, it is assumed that the data is to be read from or written to the memory 204 in a tiled or skewed tile format, or the raster scan format, or another format which is essentially "rectangular" in nature.

As shown, in step 602 the slave device programs a read/write bytes per row value into the register 412 (FIG. 8). As discussed above, the read/write bytes per row value indicates the number of bytes to be read/written in a row. In step 604 the slave device programs a skip bytes value into the register 414, wherein the skip bytes value is the number of bytes to be skipped in a row. In step 606 the slave device programs a number of rows value into the register 416, wherein the number of rows value indicates number of rows to be read/written in the memory transfer. In step 608 the slave device programs a start address value into the start address register 418, wherein the start address value indicates the page address and offset within the page for the SDRAM 204. In step 610 the slave device program is a local buffer start address value into the register 420, which comprises the start address for the local buffer or local memory within the slave device to be read/written during the transfer.

FIG. 12

Figure 12:
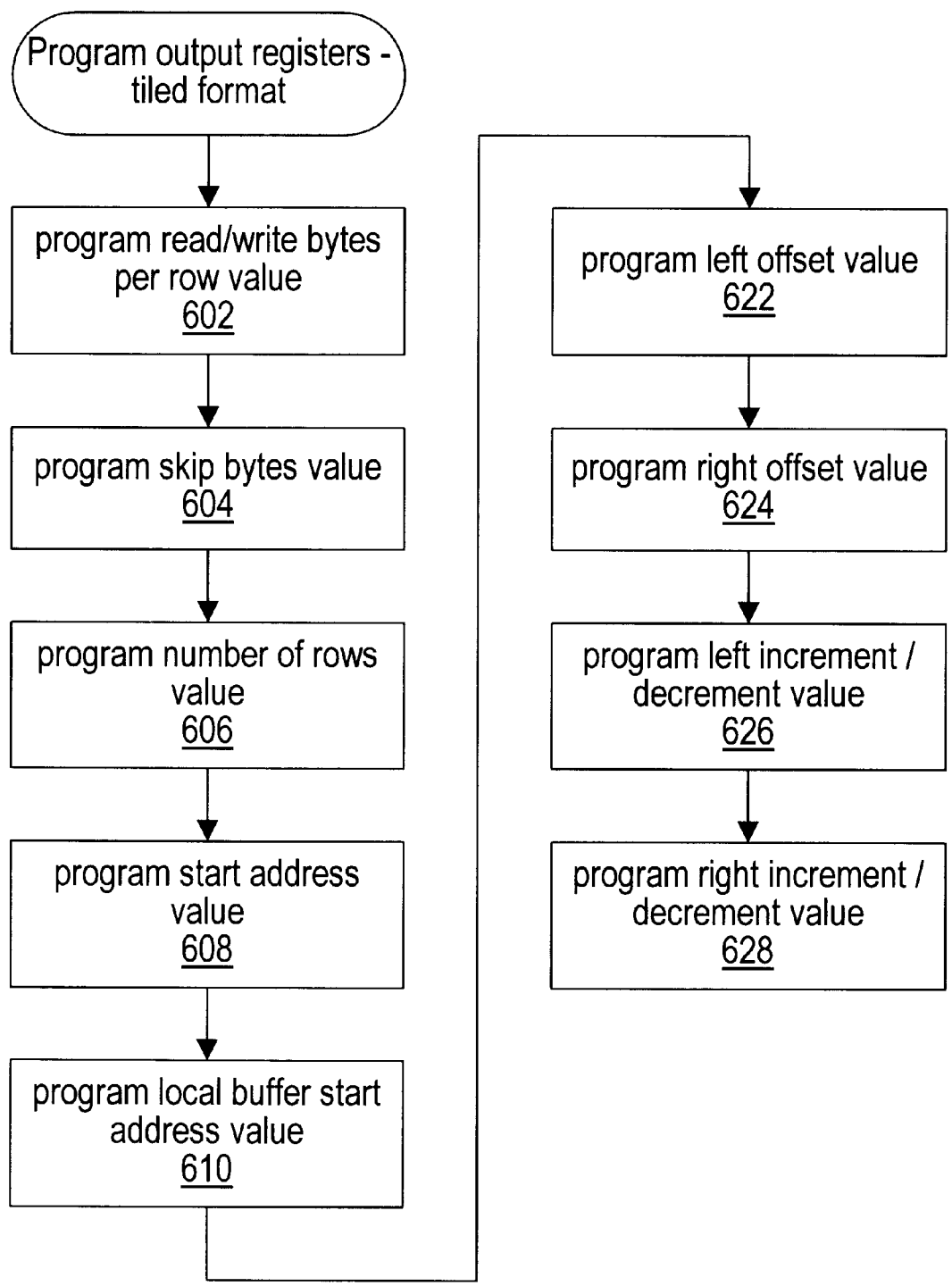
FIG. 12 is a flowchart diagram illustrating operation of a slave device programming memory transfer registers for transfer of a non-rectangular geometric shape.

Referring now to FIG. 12, a flowchart diagram illustrating operation of the slave device programming output registers during the transfer of an irregularly shaped object is shown. As shown, the slave device 402a in this embodiment performs step 602–610 as described above. In addition, the slave device 402a programs the left offset value and right offset value as shown in step 622 and 624. The slave device 402a further programs the left increments/decrement value and the right increment/decrement value in steps 626 and 628, respectively.

Non-rectangular Geometric Shapes

Referring again to FIG. 10, in step 512 the memory subsystem generates addresses for the SDRAM to be read/written. In an embodiment where an irregularly shaped object is being transferred, as shown in FIG. 17, the following pseudo code describes the operation of step 512.

```
    Address <= BaseAddress
    sequence <= BaseSequence
    if(Left Direction == Decreasing) left_offset = -left_offset
    if(Right Direction == Decreasing) right_offset = -right_offset
    for (j=0; j < rows; ++j)
Address <= Base Address;
sequence <= Base Sequence;
if(Left Direction == Decreasing) left_offset = -left_offset;
if(Right Direction == Decreasing) right_offset = -right_offset;
for (j = 0; j < rows; ++j)       // number of rows to repeat
{
    while (k < sequence)         // number of bytes in sequence
    {
        Address <= Address + 4; k = k + 4;
    }
    sequence <= sequence - left_offset + right_offset;
    Address <= Address + skip - sequence;
                                 // number of bytes to skip in the address
}
```

The frame memory architecture of the present invention supports various frame store architectures including a tiled format and skewed tile or T-tile format for I and P pictures, i.e., for reference frames, and a raster scan order of macroblocks for I, P and B picture frames. The frame memory interface architecture of the present invention further supports retrieval and storage of partial frame data, including geometric shapes which can be described by an arithmetic progression for graphics as well as rectangular blocks, e.g., macroblocks, for video frame memory operations. According to the present invention, a picture frame or video frame may comprise two fields wherein each field comprises alternative horizontal scan lines. These respective fields can be stored in memory banks according to several formats. In a first format, the fields are stored alternatively in banks of memory where the top field of macroblocks are stored in one bank and the bottom fields are stored in another bank. In a second embodiment, the fields can be stored anywhere in the memory, i.e., the top fields and bottom fields can be stored anywhere within a memory bank. The present invention also supports both frame reconstruction and field reconstruction.

FIG. 13—Macroblock Storage

FIG. 13 illustrates a video frame or picture frame which is divided into a plurality of 16×16 macroblocks. As discussed above, a frame is partitioned into macroblocks during MPEG video encoding and decoding.

FIG. 14—Tiled Storage Format

FIG. 14 shows a tiled format for storing a picture frame. As shown, the frame store memory 204 preferably stores a plurality of rows of macroblocks, wherein each page of the frame store memory stores one or more macroblocks on a respective row. According to this embodiment, the pages storing macroblocks on neighboring rows are aligned relative to each other. This tiled format is designed to minimize the number of page crossings when a reference block of data is retrieved from the frame store memory 204. In FIG. 14, each page of the SDRAM 204 stores four contiguous macroblocks which are most spatially related. In other words, in FIG. 14 the SDRAM 204 stores the macroblocks in memory pages in a tiled format, wherein each page comprises a square of four contiguous macroblocks. Thus, one page stores macroblock 0, 1, 45 and 46, a second page stores macroblocks 2, 3, 47 and 48, and so on. As mentioned above, this tiled format is designed to reduce the number of page misses or page crossings during motion compensation, when a reference block pointed to by a motion vector is retrieved from the reference frame stored in memory during reconstruction of a temporally compressed frame, such as a B or P frame.

FIG. 15—Raster Scan Storage Format

FIG. 15 illustrates a picture frame stored in a raster scan format wherein each page of the SDRAM 204 stores pixels exactly as they appear in raster scan order, i.e., on a scan line basis. Thus, in one embodiment, each page of memory may store only one scan line of pixel data. This storage format is preferably not used for reference frame data or reference block data, as this format requires a large number of page crossings.

FIG. 16—Skewed Tile Memory Storage

FIG. 16 illustrates a skewed tile format which is also designed to reduce the number of page crossings during motion compensation. FIG. 16 illustrates the manner in which reference macroblocks or reference blocks are stored in the frame store memory 204 in a skewed tile arrangement. As shown, the frame store memory 204 preferably stores a plurality of rows of macroblocks, wherein each page of the frame store memory stores one or more macroblocks on a respective row. According to this embodiment, the pages storing macroblocks on neighboring rows are skewed relative to each other to minimize the maximum number of page crossings when a reference block of data is retrieved from the frame store memory 204.

As shown in FIG. 16, a reference frame can be considered as a plurality of rows of macroblocks. Macroblocks in neighboring rows or lines are skewed as shown in FIGS. 16a–16d to reduce page crossings or page misses within a predicted field macroblock. In the preferred embodiment, each page of the frame store memory 204 stores two contiguous luma macroblocks on a row, and luma macroblocks stored on neighboring rows are skewed relative to each other by a macroblock width to minimize the maximum number of page crossings within a predicted field macroblock.

Figure 16A:
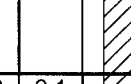
Figure 16B:
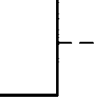
Figure 16C:
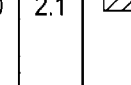
Figure 16D:
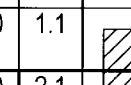

FIG. 16a illustrates a map of a reference field/frame of luma blocks with an odd number of macroblocks in a line, and FIG. 16c illustrates a map of a reference field/frame of luma blocks with an even number of macroblocks in a line. Similarly, FIG. 16b illustrates a map of a reference field/frame of chroma blocks with an odd number of macroblocks in a line, and FIG. 16d illustrates a map of a reference field/frame of chroma blocks with an even number of macroblocks in a line.

As shown, FIGS. 16a and 16c illustrate a manner in which luma blocks are stored in the skewed tile arrangement of the present invention. As shown, in the preferred embodiment luma blocks of two contiguous macroblocks, preferably from the same line or row of macroblocks, occupy one SDRAM page, which comprises 256 words in the preferred embodiment. As shown in FIGS. 16b and 16d, a single memory page stores four contiguous chroma macroblocks, preferably in a 2×2 arrangement. Thus, a single memory page stores four contiguous chroma macroblocks, with two blocks each from two neighboring rows.

In FIGS. 16a and 16c, the luma prediction block or reference block is shown shaded. As shown, the luma prediction block requires only three page crossings to be retrieved from the frame store memory 204. It is noted that, no matter where the luma prediction block or reference block is located within the reference frame in the frame store memory 204, a maximum of three page crossings is required to retrieve the respective luma reference block from the frame store memory 204. Similarly, in FIGS. 16b and 16d, a chroma prediction block or reference block is shown shaded. It is noted that, no matter where the chroma prediction block or reference block is located within the reference frame in the frame store memory 204, a maximum of three page crossings is required to retrieve the respective chroma reference block from the frame store memory 204.

For more information on the use of a skewed tile format to reduce page crossings during motion compensation, please see related co-pending application Ser. No. 08/772,442 titled "System and Method for Performing Motion Compensation Using a Skewed Tile Storage Format for Improved Efficiency" and filed Dec. 20, 1996, which is hereby incorporated by reference in its entirety.

Reading Reference Block Data in the Tiled and Skewed Tile Format

As described above, when retrieval of reference block data from the frame store memory 204 requires one or more page crossings, the slave device submits a request for each of the pages where the data resides or where the data is to be written. The memory controller 234 operating in response to the programmed memory transfer values reads or writes the entire relevant portion from a respective page before a page crossing or cross miss occurs, i.e., before the memory controller 234 begins reading another reference block portion from another page. For example, if the desired reference block data resides on three pages, the slave device is sufficiently intelligent to program the memory transfer values for three separate transfers. Accordingly, the slave device submits three different requests with three different sets of memory transfer values. In response to these three requests, the memory controller 234 performs the reads or subdivides the prediction macroblock into three regions, where each one resides on a different page. The memory controller 234 reads each one of these subdivision blocks in turn. Thus the memory controller 234 reads all of the shaded portion from the first macroblock or first page, then all of the shaded portion from the second macroblock or second page, and then all of the shaded portion from the third macroblock or third page.

In the preferred embodiment of the invention, the reference frame memory map is such that a top field resides in a first memory bank A and a bottom field resides in a second memory bank B (field mode). Alternatively, the entire reference frame is stored in a contiguous bank of memory (frame mode).

FIG. 17—Geometric Shapes

Referring now to FIG. 17, a diagram illustrating a rectangular shape and various non-rectangular shapes which may be transferred according to the present invention as shown. In the case of the geometric shapes shown in FIG. 17, and the system of the present invention, a respective slave device specifies a starting point from which the progression of addresses may then be calculated. For non-rectangular shapes, such as the triangular and trapezoidal shapes shown in FIG. 17, the exact amount to be added to the left and/or right side of the starting point is also programmed in an output register by the slave along with respective direction of the progression, i.e., either increasing or decreasing. This information is in addition to the information which is programmed as discussed above including the bytes to read value, the bytes to skip value and the number of rows value.

As an example of the operation of the present invention, to transfer the trapezoid shown in FIG. 17, the following values are programmed:

Left Offset: 1

Right Offset: 1

Left Direction: decreasing

Right Direction: decreasing

Left Direction: decreasing

Right Direction: decreasing

Rows: 5

Bytes to write: 8

Bytes to skip: total bytes in a row—bytes to write

Once these bytes have been programmed and read by the memory subsystem, the memory transfer occurs as follows. First, from the starting point programmed by the slave device, eight bytes are written. For each following or subsequent row, the left side is decreased by 1 and the right side is decreased by 1 and 8 bytes are again written for the next respective row. This operation is repeated for the number of rows specified, i.e., for five rows. In a similar manner, the system and method of the present invention can be used to describe and transfer any of the geometric shapes shown in FIG. 17.

It is noted that if an irregular shape is required or desired to be transferred to or from the memory, the system of the present invention preferably partitions the irregular shape to obtain shapes which have the desired geometric progression. Once shapes having a geometric progression are obtained, then the above approach is followed.

Conclusion

As discussed above, the mapping or storage of a picture frame into any of the above storage formats is performed on a block by block basis or macroblock basis depending on the data available. The storage of data according to different formats is performed by programming output registers with appropriate memory transfer values. The data is also retrieved from the memory by programming the same output registers with appropriate memory transfer values. Thus, the method of the present invention uses programmed registers for storing and retrieving data in different formats in the SDRAM 204. This enables a flexible, efficient and reconfigurable frame memory interface which accommodates different frame store architectures while also maximizing memory bandwidth utilization.

Therefore, the present invention comprises a frame memory interface system and method for performing video transfers according to various desired frame storage formats. The present invention includes a memory and one or more slave devices, wherein the slave devices can store or read frame data in the memory in various formats, including a tiled format, skewed tile format, or raster scan format. This provides a flexible and efficient MPEG/Graphics frame memory interface which can accommodate different MPEG/graphics frame storage formats. This maximizes memory bandwidth utilization while also reducing overhead associated with page misses or page crossings.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing a memory transfer operation in a system, wherein the system comprises a memory, a memory controller coupled to the memory, and at least one slave device coupled to the memory, the method comprising:

the slave device storing a plurality of memory transfer values to identify the transfer, wherein the plurality of values include a byte per row value indicating a number of bytes per row to be read/written, a skip bytes value indicating a number of bytes to be skipped in a row during the read/write transfer, and a number of rows value indicating the number of rows to be read/written in the transfer;

the slave device generating a request to the memory controller;

the memory controller reading said memory transfer values stored by the slave device; and the memory controller generating addresses to the memory to perform the memory transfer based on said memory transfer values.

2. The method of claim 1, further comprising:

the memory controller setting up an address generation process based on said memory transfer values after the memory controller reads said memory transfer values stored by the slave device;

wherein the memory controller generates addresses to the memory to perform the memory transfer based on said address generation process.

3. The method of claim 1, wherein said slave device programming said memory transfer values further comprises the slave device programming a start address value indicating a page address and offset within the page of the memory where the memory transfer is to begin.

4. The method of claim 1, wherein said slave device programming the memory transfer values farther comprises the slave device programming a local start address value indicating a start address for buffers in said slave device where said data is to be read/written.

5. The method of claim 1, wherein said memory transfer operation comprises transferring an object having a non-rectangular shape, the method further comprising:

the slave device programming a left offset value and a right offset value, wherein said left offset value indicates a number of bytes to the left of a start address point and wherein said right offset value indicates a number of bytes to the right of the start address point; and The slave device programming a left increment/decrement value and a right increment/decrement value, wherein said left increment/decrement value indicates an increasing/decreasing progression for a left side of the object, and wherein said right increment/decrement value indicates an increasing/decreasing progression for a right side of the object;

wherein said memory controller generating addresses to the memory to perform the memory transfer comprises the memory controller using said left and right offset values and said left increment/decrement and right increment/decrement values to generate said addresses to transfer said object having said non-rectangular shape.

6. The method of claim 1, further comprising:

one or more other devices generating request to the memory controller; and the memory controller arbitrating among said requests to grant access to one of said slave devices.

7. The method of claim 1, wherein said slave device storing a plurality of memory transfer values to identify the transfer comprises the slave device storing a plurality of memory transfer values to identify a transfer of data according to a tiled format;

wherein the memory controller generating addresses to the memory to perform the memory transfer comprises the memory controller generating addresses to the memory to perform the memory transfer according to said tiled format based on said memory transfer values.

8. The method of claim 1, wherein said slave device storing a plurality of memory transfer values to identify the transfer comprises the slave device storing a plurality of memory transfer values to identify a transfer of data according to a raster scan format;

wherein the memory controller generating addresses to the memory to perform the memory transfer comprises the memory controller generating addresses to the memory to perform the memory transfer according to said raster scan format based on said memory transfer values.

9. The method of claim 1, wherein said slave device storing a plurality of memory transfer values to identify the transfer comprises the slave device storing a plurality of memory transfer values to identify a transfer of data according to a skewed tiled format;

wherein the memory controller generating addresses to the memory to perform the memory transfer comprises the memory controller generating addresses to the memory to perform the memory transfer according to said skewed tiled format based on said memory transfer values.

10. The method of claim 1, further comprising:

a first slave device storing a plurality of memory transfer values to identify a transfer of data according to a first format;

the first slave device generating a request to the memory controller;

the memory controller reading said memory transfer values stored by the first slave device; and the memory controller generating addresses to the memory to perform the memory transfer according to said first format based on said memory transfer values;

a second slave device storing a plurality of memory transfer values to identify a transfer of data according to a second format, wherein said second format is different than said first format;

the second slave device generating a request to the memory controller;

the memory controller reading said memory transfer values stored by the second slave device; and the memory controller generating addresses to the memory to perform the memory transfer according to said second format based on said memory transfer values.

11. The method of claim 10, wherein said first format is a tiled format and said second format is a raster scan format.

12. The method of claim 1, wherein said memory transfer operation comprises transferring an object having an first irregular shape, wherein said object having said first irregular shape is divisible into two or more objects having geometric shapes, wherein said two or more objects having geometric shapes are capable of memory transfers according to a geometric progression, the method further comprising:

the slave device storing a plurality of memory transfer values to identify transfers for each of said two or more objects having geometric shapes, the slave device generating requests to the memory controller for each of said two or more objects having geometric shapes;

the memory controller reading said memory transfer values stored by the slave device for each of said requests; and the memory controller generating addresses to the memory to perform memory transfers for each of said two or more objects having geometric shapes based on said memory transfer values.

13. A frame memory interface system which accommodates different frame store architectures, comprising:

a memory for storing data;

a memory controller coupled to the memory which controls accesses to the memory;

one or more slave devices coupled to the memory controller, wherein each of said one or more slave devices includes one or more registers for storing a plurality of memory transfer values, wherein said plurality of memory transfer values includes a number of bytes value indicating a number of bytes to be read/written in a row, a skip bytes value indicating a number of bytes to be skipped in a row, and a number of rows value indicating a number of rows to be read/written during the memory transfer, wherein each of said one or more slave devices is configured to program said memory transfer values into said one or more registers according to a desired memory transfer, wherein each of said one or more slave devices is further configured to generate a memory transfer request to said memory controller;

wherein the memory controller is configured to read said memory transfer values from said one or more registers in response to receiving a request from one of said slave devices, and wherein said memory controller is further configured to generate addresses to the memory to transfer data to/from the memory based on said memory transfer values.

14. The frame memory interface system of claim 13, wherein the memory controller is configured to set up an address generation process based on said memory transfer values in response to reading said memory transfer values stored by the slave device;

wherein the memory controller generates addresses to the memory to perform the memory transfer based on said address generation process.

15. The frame memory interface system of claim 13, wherein said one or more registers in each of said slave devices further stores a start address value indicating a page address and offset within the page of the memory where the memory transfer is to begin.

16. The frame memory interface system of claim 13, wherein each of said one or more slave devices further includes storage buffers where data is read/written from/to said memory;

wherein said one or more registers in each of said slave devices further stores a local start address value indicating a start address for said buffers in said slave device where said data is to be read/written.

17. The frame memory interface system of claim 13, wherein said memory transfer operation comprises transferring an object having a non-rectangular shape, the method further comprising:

wherein said one or more registers in each of said slave devices further stores a left offset value and a right offset value, wherein said left offset value indicates a number of bytes to the left of a start address point and wherein said right offset value indicates a number of bytes to the right of the start address point; and wherein said one or more registers in each of said slave devices further stores a left increment/decrement value and a right increment/decrement value, wherein said left increment/decrement value indicates an increasing/decreasing progression for a left side of the object, and wherein said right increment/decrement value indicates an increasing/decreasing progression for a right side of the object;

wherein said memory controller generating addresses to the memory to perform the memory transfer using said left and right offset values and said left increment/decrement and right increment/decrement values to generate said addresses to transfer said object having said non-rectangular shape.

18. The frame memory interface system of claim 13, wherein said memory controller further includes arbitration logic for arbitrating among requests from said one or more slave devices.

19. The frame memory interface system of claim 13, wherein said one or more slave devices are capable of performing memory transfers according to a plurality of different frame storage formats; and wherein said memory is capable of storing data according to said plurality of different frame storage formats.

20. The frame memory interface system of claim 19, wherein said plurality of different frame storage formats includes a tiled format for storing video data as a plurality of rows of macroblocks and a raster scan format for storing video data in a scan line format.

21. The frame memory interface system of claim 20, wherein said plurality of different frame storage formats further includes a skewed tile format for storing video data as a plurality of rows of macroblocks, wherein macroblocks on neighboring rows are skewed relative to each other.

22. The frame memory interface system of claim 19, wherein said one or more slave devices includes:

a first slave device for performing memory transfers according to a first format, wherein said first slave device stores a plurality of memory transfer values to identify a transfer of data according to said first format;

a second slave device for performing memory transfers according to a second format, wherein said second slave device stores a plurality of memory transfer values to identify a transfer of data according to said second format.

23. The frame memory interface system of claim 22, wherein said first format is a tiled format and said second format is a raster scan format.

24. The frame memory interface system of claim 22, wherein said first slave device comprises reconstruction logic for performing frame reconstruction of temporally compressed video frame data; and wherein said second slave device comprises display logic for displaying a frame of video data.

25. The frame memory interface system of claim 24, wherein the temporally compressed video frame data comprises one or more motion vectors which point to a reference block stored in the memory;

wherein the reconstruction logic analyzes said one or more motion vectors and retrieves one or more reference blocks from the memory in response to said one or more motion vectors.

26. The frame memory interface system of claim 13, wherein the memory stores reference frame data used in frame reconstruction of temporally compressed video frame data;

wherein a first slave device of said one or more slave devices comprises reconstruction logic for performing frame reconstruction of temporally compressed video frame data;

wherein the temporally compressed video frame data comprises one or more motion vectors which point to a reference block stored in the memory;

wherein the reconstruction logic analyzes said one or more motion vectors and retrieves one or more reference blocks from the memory in response to said one or more motion vectors.

wherein said memory stores a reference block in at least first and second pages, wherein said first page stores a first reference block portion and said second page stores a second reference block portion;

wherein the first slave device programs said registers to access the entire first reference block portion of said reference block from said first page, and the first slave device programs said registers to access the entire second reference block portion of said reference block from said second page.

27. The frame memory interface system of claim 13, wherein said memory transfer operation comprises transfer of an object having an first irregular shape, wherein said object having said first irregular shape is divisible into two or more objects having geometric shapes, wherein said two or more objects having geometric shapes are capable of memory transfers according to a geometric progression;

wherein the slave device is configured to store a plurality of memory transfer values to identify transfers for each of said two or more objects having geometric shapes, wherein the slave device is configured to generate requests to the memory controller for each of said two or more objects having geometric shapes;

wherein the memory controller is configured to read said memory transfer values stored by the slave device for each of said requests; and wherein the memory controller is configured to generate addresses to the memory to perform memory transfers for each of said two or more objects having geometric shapes based on said memory transfer values.

\* \* \* \* \*